March 28, 1950 C. T. BEGGS 2,501,705
APPARATUS FOR MEASURING LIQUID FLOW
Filed Sept. 8, 1948

INVENTOR.
Cornelius T. Beggs
BY
Att'y

Patented Mar. 28, 1950

2,501,705

UNITED STATES PATENT OFFICE 2,501,705

APPARATUS FOR MEASURING LIQUID FLOW

Cornelius T. Beggs, San Francisco, Calif.

Application September 8, 1948, Serial No. 48,250

2 Claims. (Cl. 73—228)

This invention relates to improvements in measuring the flow of liquids and has particular reference to the measuring of the rate of flow of sewage and the like which are confined within channels of a definite known cross-sectional area.

A further object is to provide a measuring device which is anti-fouling.

A still further object is to provide a measuring device which is automatically adjustable to any change in the depth of the liquid being measured.

A still further object is to provide a device which is readily transportable and one which may be quickly inserted in a fairly inaccessible location, as through the customary screw manhole, and a device wherein the readings may be taken at a remote point, as, for instance, on the street level adjacent the manhole opening.

Other objects and advantages will be apparent during the course of the following description.

Figure 1:
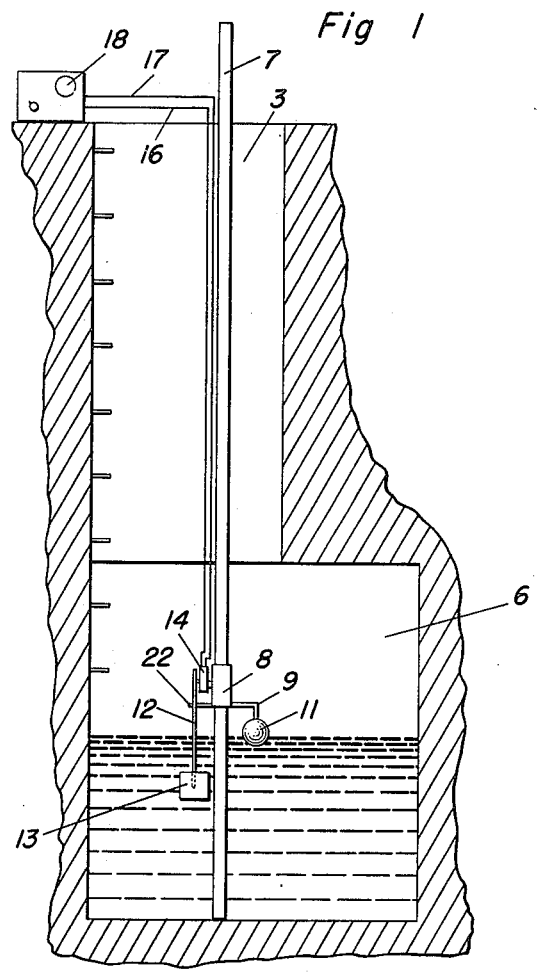
Figure 2:
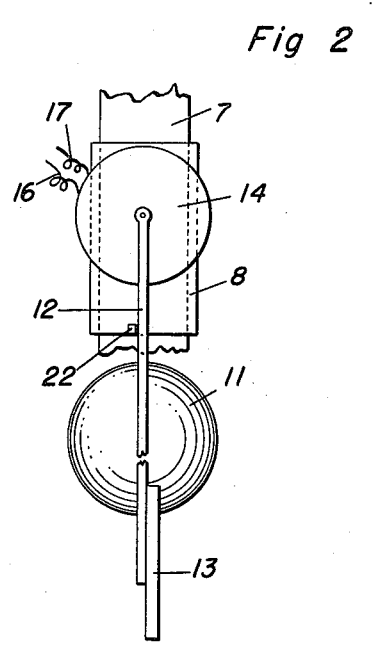
Figure 3:
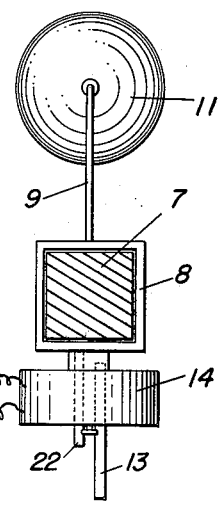
Figure 4:
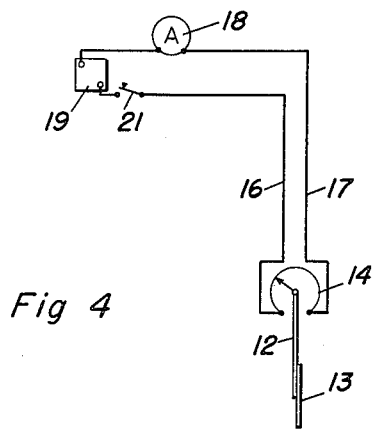

In the accompanying drawings forming a part of this specification and in which like numerals are employed to designate like parts throughout the same, Fig. 1 is a diagrammatic cross-sectional view of a sewer and manhole having my device positioned therein, Fig. 2 is a fragmentary side elevation of the float and impact paddle, Fig. 3 is a top-plan view of Fig. 2, and Fig. 4 is a diagrammatic wiring diagram.

In the measuring of sewage and like fluids it is very difficult to accurately determine the flow with the ordinary metering device of the propeller or wheel type, for the reason that rags, hair, string, etc., will clog the propellers or wheels and thus produce in accurate readings.

With my device I employ a vertically adjustable arrangement which floats at the upper surface of the flow and thus maintains an impact paddle at a definite depth and at a definite position with respect to the direction of flow, whereby the inclination of a paddle will affect an indicator located at a remote point.

In the accompanying drawings wherein, for the purpose of illustration, is shown a preferred embodiment of my invention, the numeral 3 designates a manhole which connects with a sewer 6, of any desired cross section, here shown as a square or box sewer.

My invention consists in the employing of a pole 7, here shown as being square, the purpose of which is to slidably position a slider 8, having a square cross section. Of course, it is to be understood that any other means for maintaining the slider in a definite sliding position on the pole may be employed, as, for instance, a key and key-way.

The pole 7, is of sufficient length so that its lower extremity contacts the bottom of the sewer, while the upper end extends above the top of the manhole and can be held in a vertical position in any desired manner.

Connected to the slider 8, is an arm 9, to which is attached a float 11, which float, when immersed in the sewer, will float on the top of the sewage flowing therethrough and thus hold the slider 8, at a definite height above the top of the sewage.

Mounted on the side of the slider is a pivoted arm 12, having an impact weighted paddle 13, which is immersed in the sewage with its greatest area exposed to the direction of sewage flow.

The upper end of the pivoted arm is connected to a rheostat 14, so as to actuate the same for the purpose of varying resistance in order to indicate, through connecting wires 16 and 17, a reading on an ampmeter 18, which is connected through a battery 19 and a switch 21, an indication as to the amount of deflection of the impact paddle.

A stop 22, prevents the paddle from moving in a reverse direction from its point of rest.

The result of this construction is that, when it is desired to measure the flow of sewage at a given locality, the cross-sectional area of the sewer being known, it is merely necessary to insert the pole 7, through the manhole and to place the slider 8, thereover so that the same will travel downwardly on the pole until the float 11, rests upon the top of the sewage. By rotating the pole 7, the slider and its attached parts can be moved so that the impact paddle is directed toward the line of flow so as to be contacted by the full force of the flow, with the result that the paddle and its arm 12, will be deflected from its normal vertical position and the amount of deflection will act upon the rheostat which will, in turn, cause the ampmeter needle to indicate the amount of deflection.

By taking periodic readings of the ampmeter needle position and then by consulting tables, a factor will be determined which, when used with the cross-sectional area of the sewer, will quickly determine the volume for any given depth, the depth being calculated by the position of the slider through calculations marked upon the pole, which calculations can read either from the top of the pole down or from the bottom of the pole up, or the cable carrying the wire 16 and 17, may be provided with measuring marks through which the depth of the sewage may be determined.

It will thus be seen that my device will accomplish all of the objects set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device for measuring the flow of liquids, a supporting pole extending transversely of, and having its lower end immersed in, the fluid path, sliding means slidably and non-rotatably mounted on said pole, a float carried by said slider, a weighted impact paddle carried by said slider and supported therewith by said float in the fluid path, whereby movement of said fluid will move said paddle, and an indicator remotely-positioned to indicate the amount of inclination of said paddle.

2. In a device of the character described adapted to be positioned in a path of flow of liquid confined in a channel of known cross-sectional area and consisting of a vertically disposed supporting member, a float carrying a slider slidably mounted on said supporting member, means for preventing rotation of said float and said slider about the vertical axis of said supporting member, an impact paddle pivotally mounted on said slider and maintained at a definite depth in the fluid being measured by said float, and electrical means actuated by said paddle for indicating at a remote point the inclination of said paddle.

CORNELIUS T. BEGGS.

REFERENCES CITED

The following references are of record in the file of this patent:

UNITED STATES PATENTS

| Number | Name | Date |
|---|---|---|
| 1,581,957 | Keller | Apr. 20, 1926 |